Feb. 19, 1935.  E. TURNQUIST  1,991,642
APPARATUS FOR PREPARING SHEET METAL TO BE WELDED
Original Filed Jan. 6, 1930
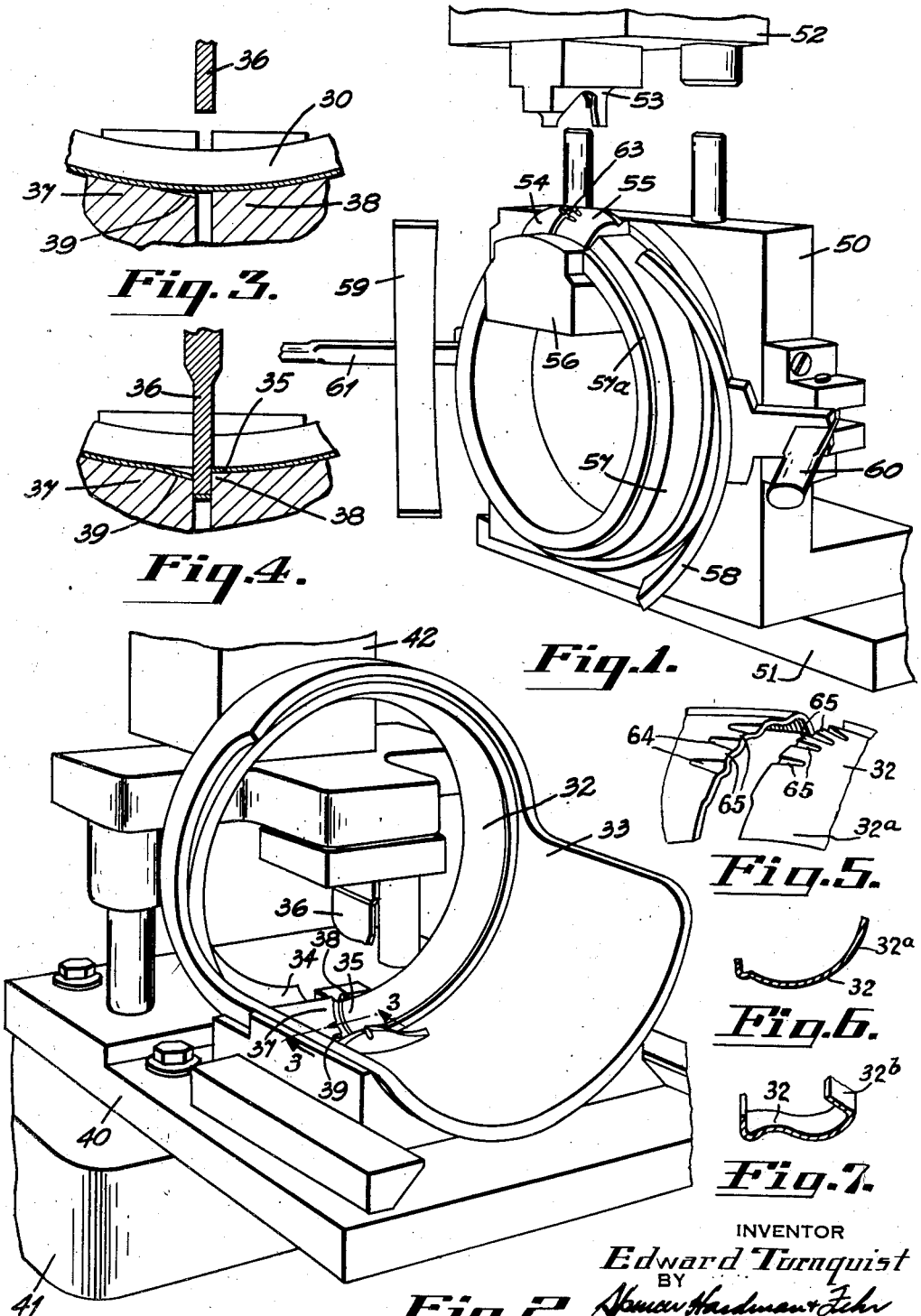
INVENTOR
Edward Turnquist
BY
his ATTORNEYS Patented Feb. 19, 1935

1,991,642

UNITED STATES PATENT OFFICE 1,991,642

APPARATUS FOR PREPARING SHEET METAL TO BE WELDED

Edward Turnquist, Anderson, Ind., assignor, by mesne assignments, to General Motors Corporation, Detroit, Mich., a corporation of Delaware Original application January 6, 1930, Serial No. 418,912, now Patent No. 1,924,220, dated August 29, 1933. Divided and this application August 24, 1933, Serial No. 686,521

18 Claims. (Cl. 153—2)

This invention relates to the manufacture of rims for the doors of electric lamps for vehicles and particularly for automobile head lamps.

It is an object of the present invention to provide suitable apparatus for the pursuance of the novel method for manufacturing lamp door rims by which a durable rim may be produced at lower cost than heretofore. The method pursued starts out with the rolling of a flat strip of sheet material into a helical form each turn of which has a cross-sectional contour suitable for a lamp door rim. In each turn of the helix there is sufficient material for forming one rim, allowing for trimming the abutting edges after cutting the helix into parts of one turn each. The next step is to cut the helix of formed material into parts of one turn each, to corrugate the end portions of each turn in preparation of an alternating butt and lap weld, and to trim the end edges thereof so that the circumference of each turn is that of a lamp door rim when said end portions are welded together. Finally, while the abutting edges are maintained in engagement under pressure, a welding current is applied in order to cause the end portions of a turn to be welded together.

It is more particularly the object of the present invention to provide an apparatus for corrugating the end portions of each turn and trimming the end edges thereof, these operations being steps of the above mentioned method which is covered in my copending application Serial No. 418,912, filed January 6, 1930.

The application is therefore a division of my copending application Serial No. 418,912, filed January 6, 1930, which is now Patent No. 1,924,220 issued August 29, 1933.

In the drawings:

Fig. 1 is a fragmentary perspective view of apparatus for trimming the end edges of each turn of rim material and for shaping the surfaces to be joined as shown in Fig. 5.

Fig. 2 is a perspective view showing the apparatus for cutting the helix of material into parts of one turn each.

Fig. 3 is an enlarged, fragmentary sectional view taken on the line 3—3 of Fig. 2.

Fig. 4 is a view similar to Fig. 3 disclosing, however, a completed cutting operation.

Fig. 5 is a fragmentary perspective view showing how the abutting ends of each turn of the helix are cut and shaped prior to being joined together by welding.

Fig. 6 discloses the intermediate cross sectional contour of a turn.

Fig. 7 is a cross section through a turn after having been shaped into the required cross sectional contour.

The formation of a strip of sheet material into a helix of the intermediate cross sectional contour shown in Fig. 6 is disclosed and specifically described in my copending application Serial No. 418,912 filed January 6, 1930, which is now Patent No. 1,924,220, issued August 29, 1933.

The dividing of the helix of intermediate cross sectional contour into lengths 32 of one turn each is effected by apparatus such as shown in Fig. 2. For the sake of clearness, only the end turn 32 of the helix is shown in position. It will be noted that the turn 32 is located within a cylindrical work holder 33 adapted to receive and support one end of the helix, while the other end which extends away from the apparatus may be supported by any suitable means, (not shown). Numeral 34 indicates one end of the turn 32, and numeral 35 indicates the other end which has been sheared from the remaining portion of the helix (which is omitted for sake of clearness) by a shear-punch 36, both side edges of which are cutting edges as the punch cooperates with a pair of parallel shearing dies 37 and 38 to cut out a slug of rim material having a width corresponding to the distance between the dies 37 and 38. Both die members 37 and 38 are provided with notches 39 located in staggered relation in order that the material adjacent the end edges of the turn of material cut off will be formed roughly into the shape shown in Fig. 4. The work holder 33 is supported by a base block 40 secured to the bed 41 of a punch press having a vertically reciprocating head 42 which supports the punch 36.

The abutting edge portions to be joined are trimmed and shaped into the form shown in Fig. 5 by the apparatus shown in Fig. 1. This trimming apparatus comprises a work holder bracket 50 attached to the bed 51 of a punch press which has a vertically reciprocating head 52, carrying a forming die and shearing member 53 which cooperates with a pair of companion die and shearing members 54 and 55 supported by block 56 carried by the bracket 50. Bracket 50 carries a cylindrical rim support or arbor 57 against which a turn of lamp rim material may be held by the arcuate clamping members 58 and 59 which are attached respectively to levers 60 and 61 pivotally suported by the bracket 50. The apparatus being in the position shown in Fig. 1, the operator places a turn 32 of rim material upon the arbor 57 with its diametrically smallest peripheral edge resting against the reduced portion 57a of said arbor and with the ends of the material resting upon the members 54 and 55 and overlying the space 63 between these members. Then the clamps 58 and 59 are moved against the turn 32 in order to clamp it firmly against the arbor 57 and to cause the desired amount of material to be trimmed off at the time the end portions are formed, as shown in Fig. 5. It will be noted that the member 53 cooperates with members 54 and 55 to trim off both end edges of the turn 32 to the shape shown in Fig. 5 and also to deepen the roughly pre-formed corrugations in the end portions so that each end portion is provided with a series of notches or corrugations 64 located in staggered relation with the corrugations 64 of the opposite end portion. Calling the portions between the notches or valleys 64, ridges 65, it will be noted that each valley 64 of one edge portion is immediately opposite a ridge portion 65 of the other edge portion. The depth of the valleys 64 of the end edges is slightly more than the thickness of the material and decreases in depth proceeding from the end edge.

After a turn has been trimmed by the apparatus shown in Fig. 1, the same is shaped into the required cross sectional contour shown in Fig. 7 by forming the peripheral flange portion 32a into the flange portion 32b and thereafter the ends of the turn are joined by welding in the manner disclosed and described in my referred copending application.

While the form of embodiment of the present invention as herein disclosed, constitutes a preferred form, it is to be understood that other forms might be adopted, all coming within the scope of the claims which follow.

What is claimed is as follows:

1. Apparatus for preparing portions of sheet metal to be welded edge to edge comprising, in combination, cooperating die members for deforming the cross-sectional contour of a portion including an edge to be welded; and a workholder having means for aligning the portions and for holding a portion to be deformed in a position to be operated upon by the die members.

2. Apparatus for preparing portions of sheet metal to be welded edge to edge comprising, in combination, a stationery and a cooperating movable die member for deforming the cross-sectional contour of a portion including an edge to be welded; and a workholder having means for aligning the portions and for holding a portion to be deformed in proper engagement with the stationary die member.

3. Apparatus for preparing portions of sheet metal to be welded edge to edge comprising, in combination, cooperating die members for deforming the cross-sectional-contour of said portions including the edges to be welded; and a workholder having means for aligning the portions and for holding them in a position to be operated upon by the die members.

4. Apparatus for preparing portions of sheet metal to be welded edge to edge comprising, in combination, a stationary and a cooperating movable die member for deforming the cross-sectional contour of said portions including the edges to be welded; and a workholder having means for aligning the portions and for holding them in proper engagement with the stationary die member.

5. Apparatus for preparing the end portions of an open ring of sheet metal to be welded edge to edge comprising, in combination, cooperating die members for deforming the cross-sectional contour of an end portion including an edge to be welded; and means for supporting the open ring, for aligning the end portions thereof and for holding an end portion to be deformed in a position to be operated upon by the die members.

6. Apparatus for preparing the end portions of an open ring of sheet metal to be welded edge to edge comprising, in combination, a stationary and a cooperating movable die member for deforming the cross-sectional contour of an end portion including an edge to be welded; and means for supporting the open ring, for aligning the end portions thereof and for holding an end portion to be deformed in proper engagement with the stationary die member.

7. Apparatus for preparing the end portions of an open ring of sheet metal to be welded edge to edge comprising, in combination, a stationary and a cooperating movable die member for deforming the cross-sectional contour of said end portions including the edges to be welded; and means for supporting the open ring, for aligning the end portions thereof and for holding the same in proper engagement with the stationary die member.

8. Apparatus for preparing corrugated portions of sheet metal to be welded edge to edge comprising, in combination, cooperating members for trimming the edges to be welded of said portions and for deepening the corrugations thereof; and a workholder having means for aligning the portions and for holding the same in a position to be operated upon by the members.

9. Apparatus for preparing corrugated portions of sheet metal to be welded edge to edge comprising, in combination, a stationary and a cooperating movable die and trimming member for trimming the edges to be welded of said portions and for deepening the corrugations thereof; and a workholder having means for aligning the portions and for holding the same in proper engagement with the stationary die and trimming member.

10. Apparatus for preparing the corrugated end-portions of an open ring of sheet metal to be welded edge to edge comprising, in combination, cooperating members for trimming the edges to be welded of said end portions and for deepening the corrugations thereof; and means for supporting the open ring, for aligning the end portions thereof, and for holding the same in a position to be operated upon by the members.

11. Apparatus for preparing the corrugated end portions of an open ring of sheet metal to be welded edge to edge comprising, in combination, a stationary and a cooperating movable die and trimming member for trimming the edges to be welded of said end portions and for deepening the corrugations thereof; and means for supporting the open ring, for aligning the end portions thereof and for holding the same in proper engagement with the stationary die and trimming member.

12. Apparatus for preparing the corrugated end portions of an open ring of sheet metal to be welded edge to edge comprising, in combination, cooperating members for trimming the edges to be welded of said end portions and for deepening the corrugations thereof; an arbor receiving the greater peripheral portion of the open ring with its end portions aligned and located adjacent the members; and means for clamping the open ring to the arbor.

13. Apparatus for preparing the corrugated end portions of an open ring of sheet metal to be welded edge to edge comprising, in combination, cooperating members for trimming the edges to be welded of said end portions and for deepening the corrugations thereof; an arbor receiving the greater peripheral portion of the open ring with its end portions aligned and located adjacent the members; and a plurality of arcuate members for clamping the open ring to the arbor.

14. Apparatus for preparing the corrugated end portions of an open ring of sheet metal to be welded edge to edge comprising, in combination, a stationary and a cooperating movable die and trimming member for trimming the edges to be welded of said end portions and for deepening the corrugations thereof; an arbor receiving the greater peripheral portion of the open ring; and means for clamping the open ring to the arbor, said stationary die and trimming member being so associated with the arbor that the end portions of the open ring are in proper engagement with said stationary die and trimming member when said ring is clamped against the arbor.

15. Apparatus for preparing the corrugated end portions of an open ring of sheet metal to be welded edge to edge comprising, in combination, a stationary and a cooperating movable die and trimming member for trimming the edges to be welded of said end portions and for deepening the corrugations thereof; an arbor merging into the stationary die and trimming member and adapted to receive the greater peripheral portion of the open ring; and means for clamping the open ring to the arbor, said stationary die and trimming member being so associated with the arbor that the end portions of the open ring are in proper engagement with said stationary die and trimming member when said ring is clamped against the arbor.

16. Apparatus for preparing the corrugated end portions to be welded edge to edge of an open sheet metal ring of a curved cross-sectional contour comprising, in combination, a stationary and a cooperating movable die and trimming member for trimming the edges to be welded of said end portions and for deepening the corrugations thereof, the stationary member having surfaces corresponding to the cross-sectional contour of the open ring and adapted to support and align the end portions of said ring; an arbor of cylindrical shape merging into the stationary die and trimming member and adapted to be engaged by the diametrically smallest peripheral edge of the open ring; and means for forcing the open ring into engagement with the arbor, said stationary die and trimming member being so associated with the arbor that the end portions of the open ring are forced into engagement with the supporting surfaces of said stationary die and trimming member when said ring is forced into engagement with the arbor.

17. Apparatus for preparing the corrugated end portions to be welded edge to edge of an open sheet metal ring of a curved cross-sectional contour comprising, in combination, a stationary and a cooperating movable die and trimming member for trimming the edges to be welded of said end portions and for deepening the corrugations thereof, the stationary member having surfaces corresponding to the cross-sectional contour of the open ring and adapted to support and align the end portions of said ring; an arbor of cylindrical shape merging into the stationary die and trimming member and adapted to be engaged by the diametrically smallest peripheral edge of the open ring; and a plurality of movable arcuate members for forcing the open ring into engagement with the arbor, said stationary die and trimming member being so associated with the arbor that the end portions of the open ring are forced into engagement with the supporting surfaces of said stationary die and trimming member when said ring is forced into engagement with the arbor.

18. Apparatus for preparing the corrugated end portions to be welded edge to edge of an open sheet metal ring of a curved cross-sectional contour comprising, in combination, a stationary and a cooperating movable die and trimming member for trimming the edges to be welded of said end portions and for deepening the corrugations thereof, the stationary member having surfaces corresponding to the cross-sectional contour of the open ring and adapted to support and properly align the end portions of said ring; an arbor of cylindrical shape merging into the stationary die and trimming member and adapted to be engaged by the diametrically smallest peripheral edge of the open ring; and a plurality of pivotally mounted arcuate members for forcing the open ring into engagement with the arbor, said stationary die and trimming member being so associated with the arbor that the end portions of the open ring are forced into engagement with the supporting surfaces of said stationary die and trimming member when said ring is forced into engagement with the arbor.

EDWARD TURNQUIST.